DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED DECEMBER 4, 1973

917 O.G. 8

T917,004

PROCESS FOR THE CHLORINATION OF POLYOLEFINS

Warren L. Young, 9542 E. Damuth Place, Baton Rouge, La. 70815; John T. Holloway, 4121 Florida St., Zachary, La. 70791; and James S. Kennedy, 463 W. Chalfont St., Baton Rouge, La. 70815

Filed Dec. 11, 1972, Ser. No. 313,765

Int. Cl. C08f *45/04*

U.S. Cl. 260—29.6 XA

No Drawing. 12 Pages Specification

A process for the chlorination of essentially linear polyolefins in suspension in an inert liquid wherein such chlorination takes place at least in part at a temperature above the agglomeration temperature of the polyolefin being chlorinated and in the presence of an inert filler material, e.g., a platy talc, to control the particle size of the chlorinated product, wherein the improvement consists of adding the inert filler material during that portion of the chlorination reaction which is conducted at or above the agglomeration temperature of the polyolefin. Utilization of this process permits the obtainment of chlorinated polyolefin of small particle size, e.g., less than 600 microns, while utilizing as little as 4 parts of inert filler per 100 parts of polyolefin.